(12) United States Patent
Kammel et al.

(10) Patent No.: US 7,025,344 B2
(45) Date of Patent: Apr. 11, 2006

(54) RUBBER BEARING, PREFERABLY A STABILIZING BEARING, AND METHOD FOR MOUNTING THIS BEARING

(75) Inventors: Helmut Kammel, Damme (DE); Raik Michelmann, Melle (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 303 days.

(21) Appl. No.: 10/362,486

(22) PCT Filed: Jun. 19, 2002

(86) PCT No.: PCT/DE02/02220

§ 371 (c)(1),
(2), (4) Date: Feb. 20, 2003

(87) PCT Pub. No.: WO03/004901

PCT Pub. Date: Jan. 16, 2003

(65) Prior Publication Data

US 2004/0096135 A1    May 20, 2004

(30) Foreign Application Priority Data

Jul. 6, 2001    (DE) ................................ 101 32 379

(51) Int. Cl.
*B60G 21/04*    (2006.01)
(52) U.S. Cl. ................... 267/189; 267/293; 403/399
(58) Field of Classification Search ............ 267/189, 267/293, 140.12; 403/281, 282, 256, 260, 403/261, 398, 399
See application file for complete search history.

(56) References Cited

U.S. PATENT DOCUMENTS

| 862,749 | A | | 8/1907 | McLaughlin | |
|---|---|---|---|---|---|
| 2,027,577 | A | * | 1/1936 | Crane | ..................... 267/189 |
| 2,626,797 | A | * | 1/1953 | Cuskie | ..................... 267/189 |
| 2,770,453 | A | * | 11/1956 | Cuskie | ..................... 267/189 |
| 2,852,269 | A | * | 9/1958 | Gaines | ............... 280/124.107 |

(Continued)

FOREIGN PATENT DOCUMENTS

DE    35 31 340    3/1987

(Continued)

*Primary Examiner*—Robert A. Siconolfi
(74) *Attorney, Agent, or Firm*—McGlew and Tuttle, P.C.

(57) ABSTRACT

A rubber mount, preferably a stabilizer mount, and a process are provided for mounting the mount, which is used to mount sectional bars used preferably as stabilizers. The mount is of a simplified mounting type. For this purpose, the elastomeric mount body (2) for receiving the sectional bar as well as a clamp (3) for jointly fastening the mount (1) and the sectional bar to other components forms a structural unit according to the present invention already before the mounting on the sectional bar. Both the mount body (2) and the clamp (3) receiving it have an axially extending opening gap (5). The mounting of the mount (1) on the sectional bar is carried out using the opening gap (5) by pressing the sectional bar through this opening gap into the mount (1), i.e., the mount (1) is clamped on the sectional bar. The structural unit clamped on the sectional bar can be fixed on the sectional bar by closing means (6, 6') arranged at the axial ends of the clamp (3) after closing the opening gap (5) while the elastomer is pretensioned.

26 Claims, 4 Drawing Sheets

U.S. PATENT DOCUMENTS

| | | | |
|---|---|---|---|
| 3,218,053 A | * 11/1965 | Shreve | 267/189 |
| 3,565,374 A | 2/1971 | Jones | |
| 5,013,166 A | * 5/1991 | Domer | 384/220 |
| 5,100,114 A | * 3/1992 | Reuter et al. | 267/293 |
| 5,520,465 A | * 5/1996 | Kammel | 384/220 |
| 5,865,429 A | * 2/1999 | Gautheron | 267/141.7 |
| 6,007,058 A | * 12/1999 | Kokubo et al. | 267/140.12 |
| 5,544,849 A | * 8/1996 | Peterson et al. | 248/74.1 |
| 5,857,659 A | * 1/1999 | Kato et al. | 248/634 |

FOREIGN PATENT DOCUMENTS

| | | |
|---|---|---|
| DE | 89 01 525.8 | 5/1989 |
| DE | 39 09 052 | 9/1990 |
| DE | 197 16 934 | 10/1997 |
| EP | 0 227 869 | 7/1987 |
| EP | 0 707 988 | 4/1996 |
| EP | 0 911 195 | 4/1999 |
| FR | 2 712 949 | 6/1995 |

* cited by examiner

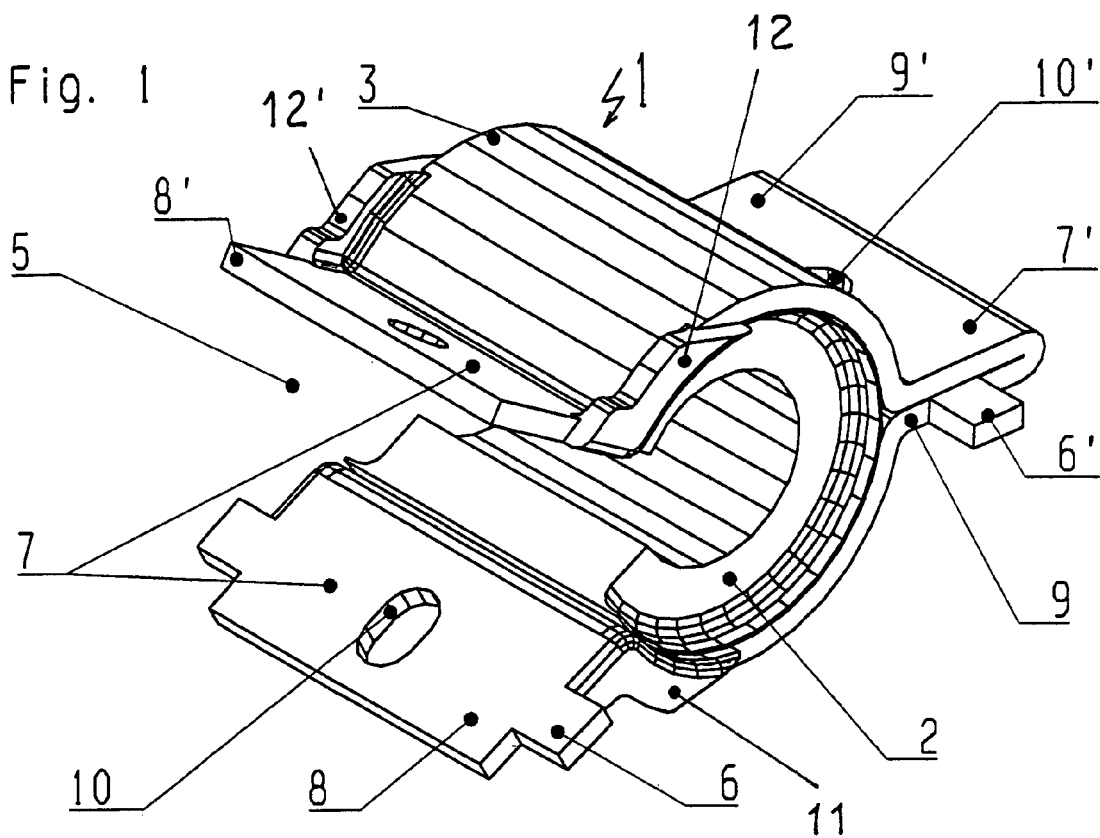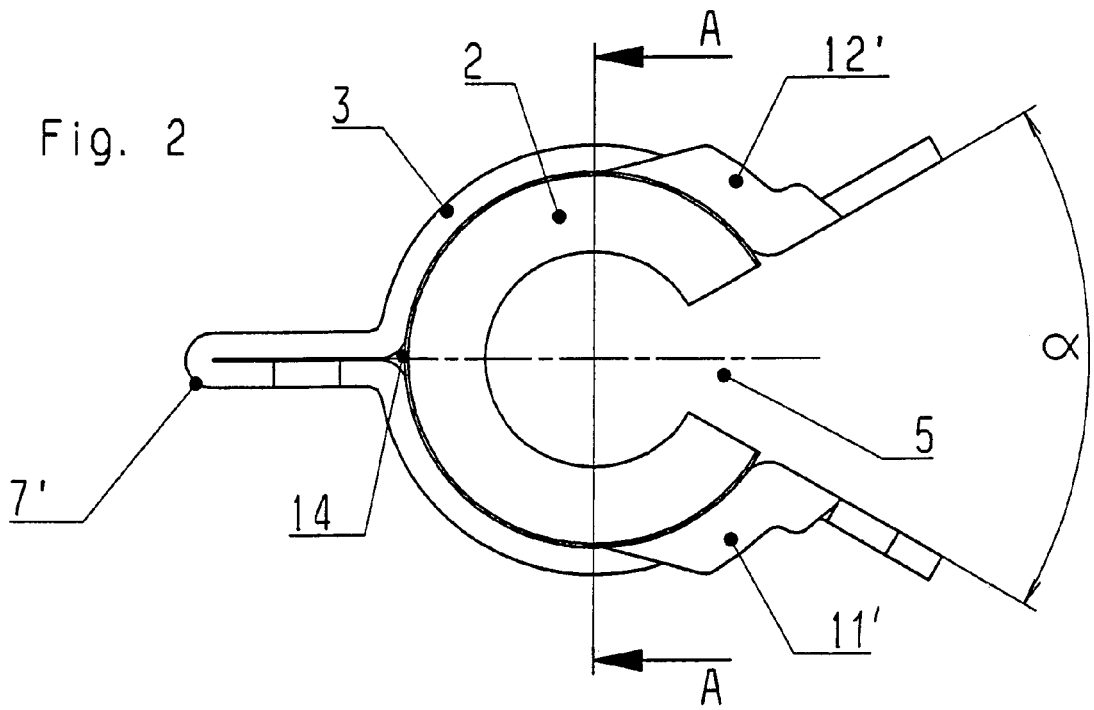

RUBBER BEARING, PREFERABLY A STABILIZING BEARING, AND METHOD FOR MOUNTING THIS BEARING

FIELD OF THE INVENTION

The present invention pertains to a rubber mount for mounting cylindrical sectional bars, preferably for mounting stabilizers, as well as to a process for mounting such a mount on a sectional bar or stabilizer.

BACKGROUND OF THE INVENTION

Rubber mounts are frequently used for various purposes for elastically mounting cylindrical sectional bars. For example, the stabilizers of motor vehicles are mounted by means of corresponding rubber mounts. The stabilizer is received for this purpose by the elastomeric mount body and fastened together with this on other components, e.g., on the auxiliary frame of a vehicle, by means of a clip (or clamp or bracket) surrounding the mount body. According to the state of the art, the stabilizers are supplied either with premounted mounts vulcanized on the stabilizer, or the mounting of the mounts is carried out in the course of the fastening of the stabilizer to the other components directly at the user. The first solution requires high manufacturing costs for the supplier of the stabilizers, especially because the mounting of the mounts on the stabilizer is often comparatively difficult and requires a great mounting effort. To mount a mount, the clip (the clamp) is pushed over the stabilizer from the axial end. The same procedure is subsequently followed with the rubber body of the mount, and this is pushed over the stabilizer up to the point at which the sectional bar shall be mounted. The frequently relatively complicated geometry of the stabilizer makes the displacement of the rubber in the axial direction considerably difficult, at least in some sections. After the elastomer, i.e., the mount body proper, has been pushed over, the clip is pushed over the rubber body to fix the mount body, and the mount body must be prevented in the process from being displaced from the intended position in the axial direction.

In the case of on-site mounting in the course of the installation of the stabilizers, a clip that is open on one side is placed around the rubber body pushed previously over the stabilizer. During the fastening of the stabilizer with the rubber mount pushed over it to, e.g., the auxiliary frame, which is carried out by means of screws, the pretension must be applied for the elastomer by means of the screws. This variant proved not to be particularly user-friendly in this respect, aside from the aforementioned difficulties arising during the pushing over of the elastomeric mount body.

SUMMARY OF THE INVENTION

The object of the present invention is to design a mount of the type such that its mounting on a sectional bar or stabilizer is simplified compared with the state of the art. Furthermore, the object is to provide a process for mounting a mount of a corresponding design.

According to the invention, a rubber mount is provided with an elastomeric mount body to receive a cylindrical sectional bar, preferably a stabilizer. A clip is used to jointly fasten the mount and the sectional bar to other components, which form a structural unit. The clip has an axially extending opening gap, which is open before the mounting on the sectional bar. The arrangement makes possible the clamping of the mount on the sectional bar. The clip can be fixed on the sectional bar by a closing means arranged on the clamp after clamping on the sectional bar while the opening gap is closed and the elastomer is pretensioned.

According to another aspect of the invention, a process is provided for mounting a rubber mount on a sectional bar, preferably on a stabilizer. The elastomeric mount body is introduced into a clip (or clamp) used for the subsequent fastening of the mount and of the sectional bar. The mount body is clamped, together with the clamp surrounding it, on the sectional bar via an opening gap extending axially through the mount body and the clamp. The opening gap is closed. The straps arranged on the radially outwardly extending surface elements of the clamp are bent twice, so that they surround the additional surface elements, which are in contact with the surface elements, in a clip-like manner. This results in keeping the opening gap closed and fixing the mount on the sectional bar while pretensioning the elastomer.

The rubber mount according to the present invention (hereinafter also called "mount") comprises in the known manner an elastomeric mount body for receiving an essentially cylindrical sectional bar or stabilizer (hereinafter called stabilizer) as well as a clip (clamp), which is used to jointly fasten the mount and the stabilizer to other components (e.g., to an auxiliary frame). However, unlike in the state of the art, the mount body and the clamp form a structural unit according to the present invention already before the mounting on the stabilizer. Both the elastomeric mount body and the clamp receiving same have an axially extending opening gap. The opening gap is designed such that the stabilizer can be pressed through the opening gap into the mount, i.e., the mount can be clamped onto the stabilizer. The assembly unit clamped onto the stabilizer can be fixed on the sectional bar while the elastomer is pretensioned after the closure of the opening gap by means of closing means arranged at the axial ends of the clamp.

Corresponding to a possible embodiment of the rubber mount according to the present invention, the closing means are designed in the form of straps, which are arranged at the axial ends of two wings, which are located opposite each other on the circumference of a closed clamp and extend radially to the outside. The wings comprise two surface elements, which are in contact with one another when the opening gap of the mount mounted on the sectional bar is closed. To fix the mount, the straps, which are arranged on one of the surface elements of a wing each and are bent twice, surround the respective other surface element of the corresponding wing and thus keep closed the opening gap formed between the surface elements of one of the wings. The closing means, in the form of the straps, are a direct part of the clamp in this embodiment of the mount, but it is also possible to keep the opening gap closed by riveting or welding in the area of the wings of the clamp. To fasten the mount to other assembly units, the wings have openings, preferably for passing through a screw.

For the fixation of the mount by the closing means, the opening gap has an opening angle of 50° to 70°, whereby the apex of the opening angle is on the axis of the mount. The opening angle is preferably about 60°.

The mount according to the present invention makes possible simple and therefore low-cost mounting on the stabilizer. The customer obtains the stabilizer with premounted rubber mounts and needs only to fasten the entire unit comprising the stabilizer and the mounts by means of holes provided on the clips of the mounts and screws during the installation of the stabilizer. The customer no longer needs to care about the fixation of the elastomeric rubber body to the stabilizer. In particular, the pretensioning of the elastomer necessary for the fixation no longer needs to be applied via the screw connection used to fasten the entire arrangement. At the supplier of the stabilizers, the design of the mount as a structural unit with the axial opening gap permits simple mounting on the stabilizer even in the case of complicated stabilizer geometries, as a result of which the mounting costs will decrease markedly.

According to practical embodiments, the clamp, preferably made of a metallic material of small thickness, has reinforcements. Radially outwardly extending lugs may be provided, e.g., on the optionally present wings in the area of the opening gap in the vicinity of the closing means, and/or the clamp may have a ribbing on its outer surface at least on the circumference surrounding the mount body, the ribs preferably extending in the axial direction.

To support the mounting, one or more elevations engaging complementary depressions of the inner surfaces of the clamp are provided on the outer surface of the elastomeric mount body in an advantageous embodiment of the rubber mount according to the present invention.

The clip or the clamp may have a one-piece design or comprise two parts, which surround the mount body on its circumference in an approximately semicircular pattern, but which are connected to one another on the side located opposite the opening gap before the insertion of the mount body. Depending on the intended use of the mount and the desired characteristic, a plastic shell may be additionally inserted between the mount body and the clamp while the basic design is maintained. To axially fix the mount body and optionally the plastic shell in the clamp, a ring collar each, which extends over some sections or over the entire circumference surrounding the mount body, is provided at the axial ends of the clamp in one embodiment of the present invention.

A process for mounting a mount designed according to the present invention is as follows. If the clip or clamp comprises two parts, the two parts are first fitted together at least partially. The elastomeric mount body is then introduced into the clip or clamp, in which the opening angle of the opening gap is preferably 60°. The structural unit formed in this manner is clamped onto the stabilizer. This is done by pressing the sectional bar through the opening gap into the assembly unit, so that it is not necessary to push the mount axially over the stabilizer beginning at the ends of the sectional bar. The opening gap makes it possible to clamp the mount directly on the sectional bar at the intended site. The opening gap is then closed and the mount body is pretensioned at the same time by means of closing means provided on the clip as well as fixed on the sectional bar, the straps arranged on the radially outwardly extending surface elements of the clamp being bent twice for this purpose, so that they surround the surface elements that form together with them the aforementioned wings for fastening the mount in a clip-like manner. The opening gap is thus kept closed. According to an especially advantageous embodiment of the mount or clamp according to the present invention, the external diameter of the clamp decreases during the closing of the opening gap in the course of the mounting, so that a highly uniform stress distribution is obtained in the elastomer over its entire circumference. Without the risk of slipping of the mount body, the stabilizer can be mounted now together with the mount, e.g., on an auxiliary frame.

The elastomeric mount body may be connected to the clamp by a vulcanization operation before it is pushed over the stabilizer. However, it is sufficient, in principle, to place the mount body into the clamp without fixing. The assembly unit formed by the clamp and the mount body may be optionally fixed additionally on the stabilizer by a bonded connection. If the mount body is not connected to the clamp by vulcanization, the clamp may be provided with a surface protection already before the mounting. The surface protection is otherwise applied after the vulcanization operation.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a perspective view showing the rubber mount according to the present invention before the mounting on the sectional bar;

FIG. 2 is a view with a radial section showing the mount according to FIG. 1;

DESCRIPTION OF THE PREFERRED EMBODIMENTS

Figure 3:
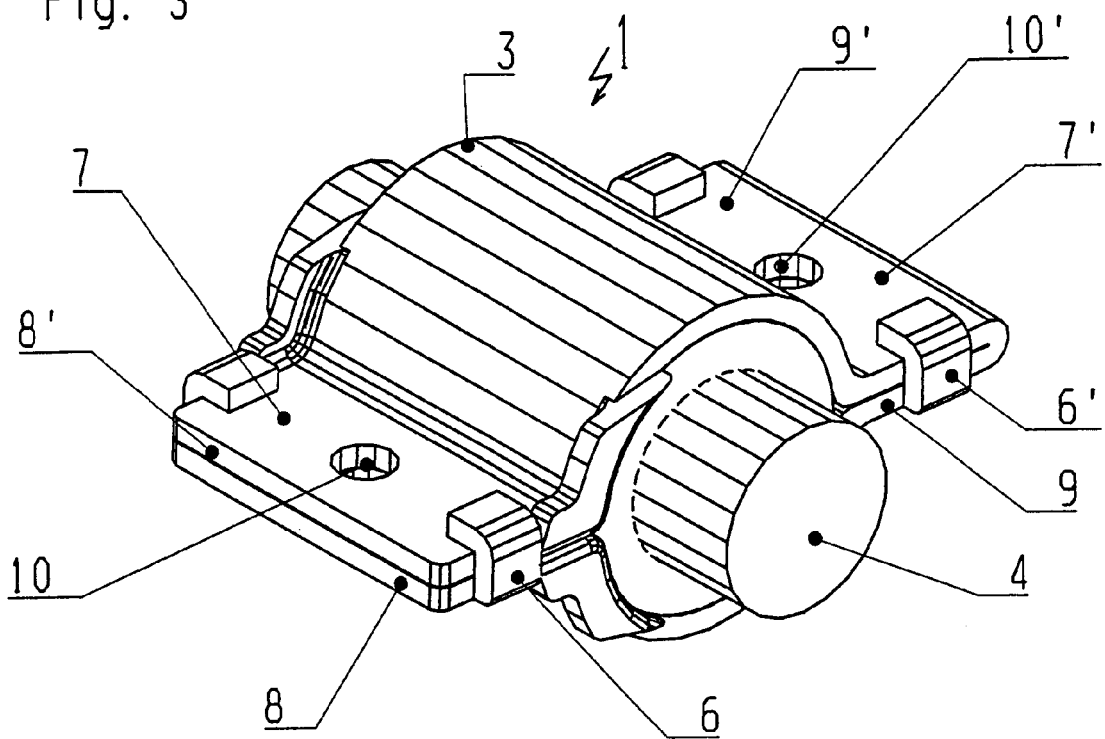
FIG. 3 is a perspective view showing the rubber mount according to FIG. 1 mounted on the stabilizer.

Referring to the drawings in particular, FIG. 1 shows the mount 1 according to the present invention. The mount 1 comprises the elastomeric mount body 2 and the clip 3 (clamp) surrounding the mount body 2, which form a structural unit. According to the example, the clamp 3 has a one-piece design. Both the clamp 3 and the mount body 2, consisting of rubber, have an axially extending opening gap 5. Straps 6, 6', which will later be used as closing means, are provided on the surface elements 8, 9 at the axial ends of the clamp 3. The surface elements 8, 8', 9, 9' have holes 10, 10', via which the entire arrangement including a stabilizer 4 accommodated by the mount 1 (see FIG. 3) can be connected to other components by means of a screw connection. In practice, at least one of the holes, which is common after the closing of the opening gap 5 and forms the opening 10, will be rather designed as an elongated hole for tolerance reasons, unlike as shown in the drawings.

The design of the mount 1 is illustrated once again by FIG. 2, which shows the mount 1 according to FIG. 1 in a radially extending section. The elastomeric mount body has an elevation 14 as a mounting aid, which engages a corresponding depression of the inner surface of the clamp 3 after the insertion into the clamp. The axially extending opening gap 5 preferably has an opening angle $\alpha$ of 60°. Thus, it is designed such that it enables the mount 1 to be clamped on the stabilizer 4. The opening gap 5 is closed after the clamping on, and the straps 6, 6' provided on the surface elements 8, 9 of the clamp 3 are bent twice. As a result, the straps 6, 6' acting as closing means surround the surface elements 8', 9', so that the opening gap 5 remains closed and the surface elements 8, 8' and 9, 9' form a common, radially outwardly extending wing (7, 7') each. This is illustrated by FIG. 3. Radially outwardly extending lugs 11, 11' and 12, 12' on the wings 7, 7' are located in the area of the opening gap in the vicinity of the closing means. The external diameter of the clamp 3 is reduced during the closing of the opening gap 5 of the mount 1, which had previously been pushed over the stabilizer 4. As a result, the elastomeric rubber body 2 is pretensioned, and a uniform stress distribution becomes established over the entire circumference of the component. The mounts 1 and the stabilizer 4 mounted in it can be fastened to other components, e.g., to the auxiliary frame of a vehicle, by means of screws to be led through the holes 10, 10' of the wings 7, 7'.

Figure 4:
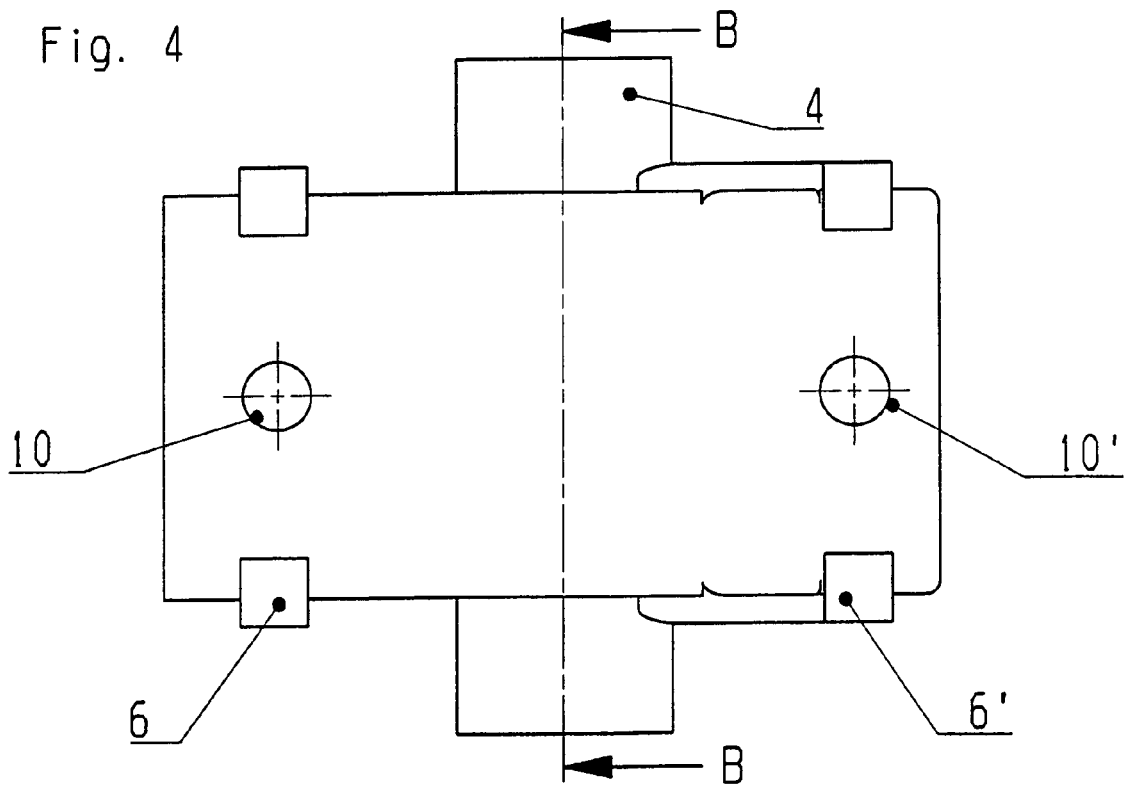
FIG. 4 is a top view of the mounted mount according to FIG. 3 when viewed toward the wings.
Figure 5:
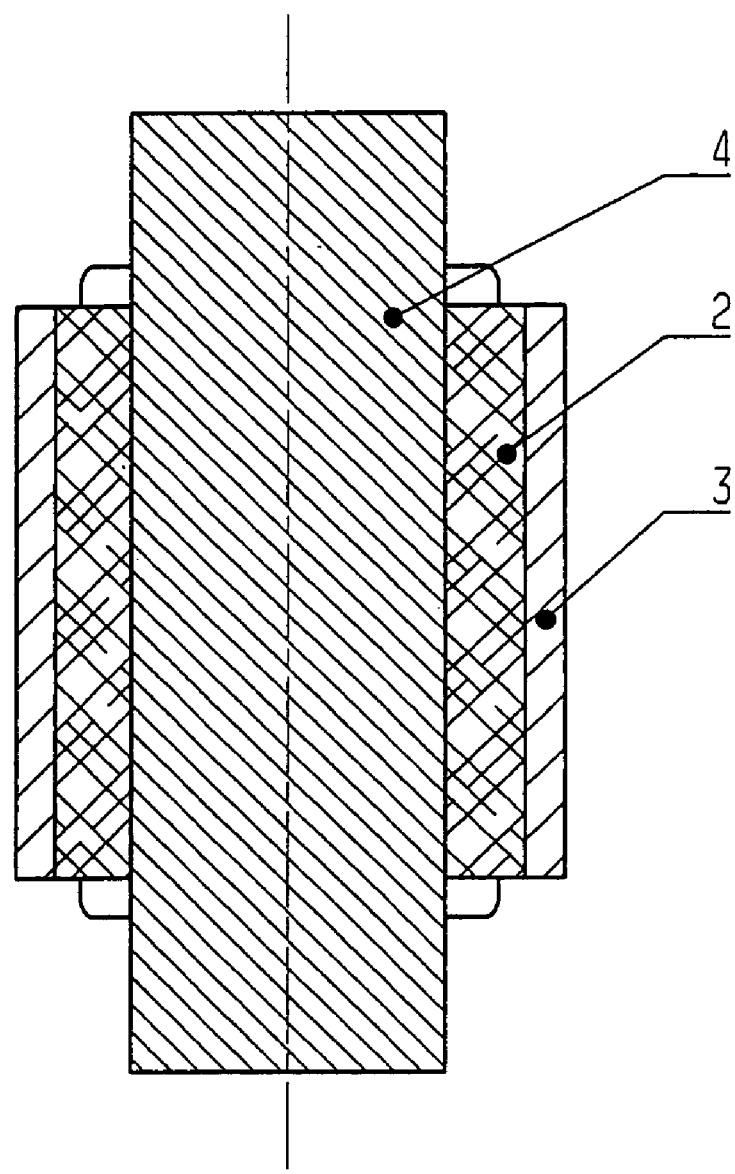
FIG. 5 is a sectional view along line B—B showing the mount according to FIG. 4.

FIG. 4 shows once again the mount 1 mounted on the stabilizer 4 according to FIG. 3 when viewed toward the wings 7, 7'. It can be clearly recognized how the closing means 6, 6' surround one of the surface elements 8, 8', 9, 9' forming the wings 7, 7'. The holes 10, 10', by means of which the entire arrangement can be fastened to other components, are arranged radially on the outside. The conditions are shown once again in FIG. 5 in a sectional view with a section along the line B—B.

Figure 6:
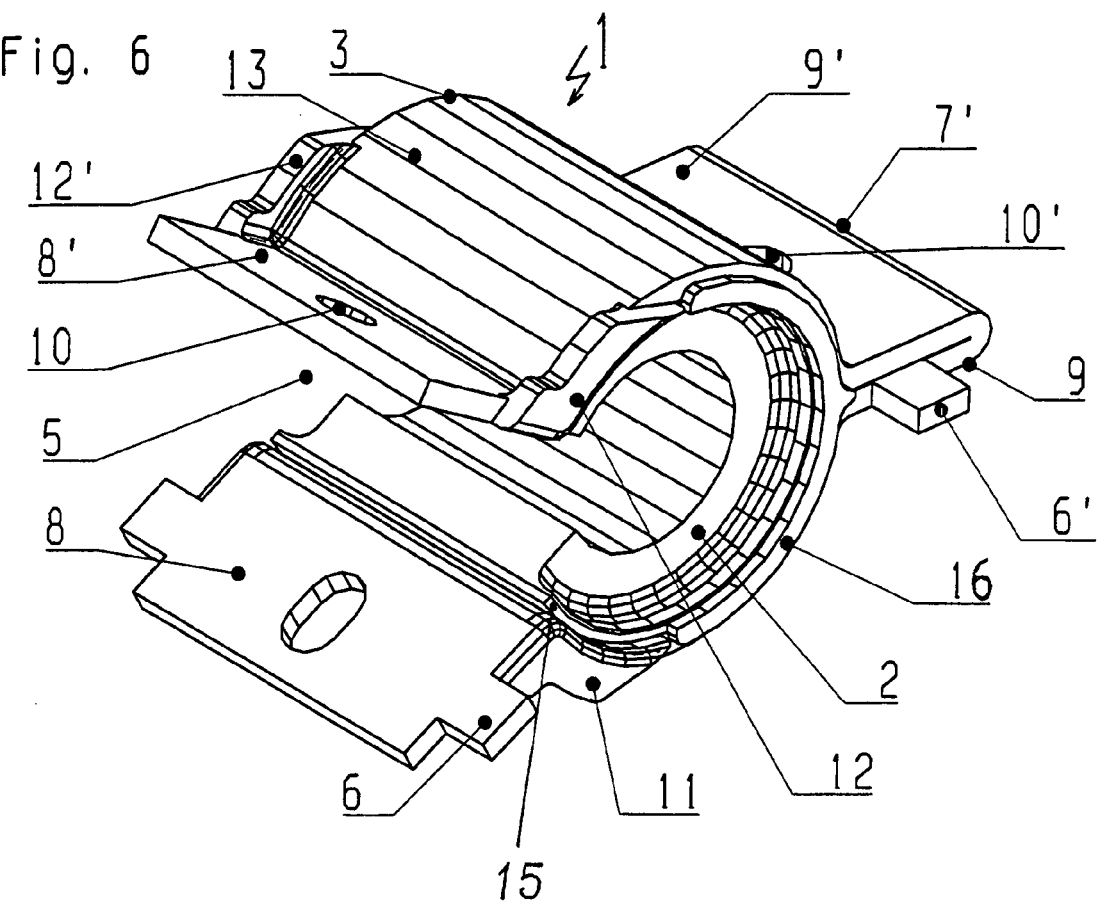
FIG. 6 is a perspective view showing a design of the mount with a plastic shell inserted between the mount body and the clamp and with an axially arranged ring collar.
Figure 7:
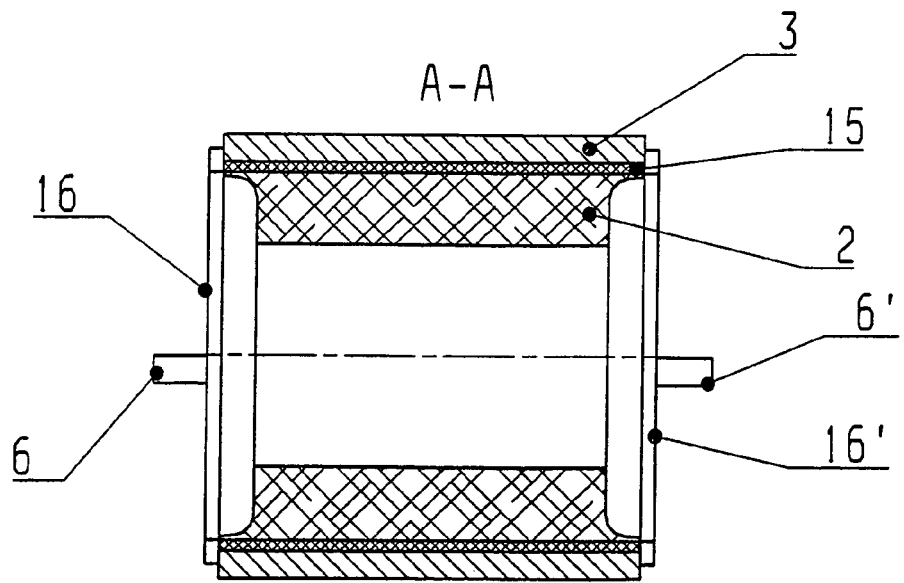
FIG. 7 is an axial sectional view of the mount according to FIG. 6.

FIG. 6 pertains to an embodiment of the mount 1, in which a ring collar 16, 16' extending over at least parts of the circumference is provided at the axial ends of the clamp 3. This embodiment is especially advantageous when the mount body 2 and the clamp 3 are not vulcanized because, e.g., a plastic shell 15 is additionally inserted between the elastomeric mount body 2 and the clamp 3, as in the embodiment according to FIG. 6. The ring collar 16, 16' prevents the rubber body 2 (or the rubber body 2 and the plastic shell 15 surrounding it) from slipping within the clamp 3 when the assembly unit is pushed over the sectional bar 4. Just as in the case of the mount 1 according to FIG. 1, the clamp 3 has a ribbing, whose ribs 13 extend in the axial direction, on its outer circumference to increase the mechanical stability. The design of the mount 1 according to FIG. 6 is illustrated once again by the view in FIG. 7, which shows the arrangement in an axial section. The ring collars 16, 16' at the axial ends of the clamp 3 as well as straps 6, 6', which still point axially to the outside before the opening gap 5 is closed and the mount 1 is fixed on the stabilizer 4, can be clearly recognized. The plastic shell 15 surrounding the rubber body 2 can be clearly recognized as well. Since vulcanization is not possible to connect the elastomer to the clamp 3 due to the insertion of the plastic shell 15, the ring collars 16, 16' represent an effective measure to prevent the components of the assembly unit from slipping during clamping on the stabilizer.

While specific embodiments of the invention have been shown and described in detail to illustrate the application of the principles of the invention, it will be understood that the invention may be embodied otherwise without departing from such principles.

The invention claimed is:

1. A rubber mount comprising:
   an elastomeric mount body to receive a cylindrical sectional bar of a stabilizer; and
   a clip used to jointly fasten said elastomeric mount body and said sectional bar to other components, wherein said elastomeric mount body and said clip form a structural unit, both said elastomeric mount body and said clip receiving the same having an axially extending opening gap shaped to simultaneously receive said sectional bar longitudinally, said opening gap being open before the mounting on said sectional bar for making possible a clamping of said mount on said sectional bar, said clip including a closing means for fixing said clip on said sectional bar, said closing means being monolithically arranged on said clip wherein after clamping on said sectional bar said opening gap is closed and said elastomeric mount body is pretensioned.

2. A rubber mount in accordance with claim 1, wherein said closing means includes straps as part of said clip, said straps being arranged at the axial ends of two radially outwardly extending wings located opposite each other, said wings each comprise two surface elements located next to each other when said opening gap of said elastomeric mount body is laterally mounted on said sectional bar and closed, said straps being arranged at one of said surface elements with each strap bent twice with said surface element surrounding said respective other surface element to keep the elastomer of said elastomer mount body under pretension and said surface elements keeping said opening gap formed between said surface elements of one of said wings closed, and wherein said wings have openings for fastening the mount to other assembly units.

3. A rubber mount in accordance with claim 1, wherein the external diameter of the cross-sectional of said clip decreases during the closing of said opening gap.

4. A rubber mount in accordance with claim 1, wherein an opening angle ($\alpha$) of said opening gap large enough to laterally accommodate said sectional bar, whose apex is located on the axis of the mount, is 50° to 70° before the rubber mount is mounted.

5. A rubber mount in accordance with claim 4, wherein said opening angle ($\alpha$) of said opening gap is about 60° before the rubber mount is mounted.

6. A rubber mount in accordance with claim 2, wherein said wings include a set of lugs to reinforce said clip, each of said lugs projecting from an outer axial end of said wings and extending to an outer axial region of said surface elements adjoining said wings of which said opening gap extends, in an area of the transition of a circumference surrounding said mount body to said surface elements.

7. A rubber mount in accordance with claim 1, wherein said clip has a ribbing on the outer surface, in an area of a circumference surrounding said elastomeric mount body.

8. A rubber mount in accordance with claim 7, wherein a plurality of ribs of said ribbing extend in the axial direction.

9. A rubber mount in accordance with claim 1, wherein said elastomeric mount body has on its outer surface, one or more elevations engaging complementary depressions of the inner surface of said clip.

10. A rubber mount in accordance with claim 1, wherein said clip is a one-piece monolithic element.

11. A rubber mount in accordance with claim 1, further comprising a plastic shell inserted as a surface protection between said elastomeric mount body and said clip.

12. A rubber mount in accordance with claim 1, wherein a ring collar is provided on the axial front side of said clip, said ring collar extending over some sections of a circumferential area of said clip surrounding said mount body or over an entire circumferential area of said clip surrounding said mount body.

13. A process for mounting a rubber mount on a sectional bar, the process comprising:
   introducing an elastomeric mount body into a clamp used for the subsequent fastening of the mount and of the sectional bar;
   positioning said mount body together with the clamp surrounding it in a lateral position on the sectional bar lengthwise in relation to an axis of said rubber mount via an opening gap extending axially through said mount body and said clamp and arranging the tensioning of said mount body around the sectional bar simultaneously with said positioning;

closing said opening gap to clamp said mount body on the said sectional bar;

bending straps arranged on radially outwardly extending surface elements of said clamp twice, so that they surround additional surface element portions in contact with the surface elements, in a clamping connection manner to keep said opening gap closed and fix the mount on said sectional bar while pretensioning the elastomer of said elastomer mount body.

14. A process in accordance with claim 13, wherein said clamp is provided with a surface protection before said mount body is inserted.

15. A process in accordance with claim 13, wherein said mount body is inserted into said clamp together with a plastic shell surrounding it.

16. A process in accordance with claim 13, wherein said elastomeric mount body and said clamp are connected to one another by vulcanization before being clamped on the sectional bar, and said clamp is provided with a surface protection thereafter.

17. A process in accordance with claim 13, wherein said mount body is fixed to the sectional bar by means of an adhesive after it has been clamped on the sectional bar or while it is being clamped on the sectional bar.

18. A rubber mount and section bar assembly, comprising:
a cylindrical sectional bar;
an elastomeric mount body receiving said sectional bar; and
a clamp jointly fastening said elastomeric mount body and said sectional bar to other components said elastomeric mount body and said clamp form an integral structural unit, the length of said integral structural unit having an axially extending opening gap with a predetermined angle to longitudinally receive said cylindrical sectional bar along the length in a pre-clamped state before the mounting on said sectional bar, said clamp including a closing device for fixing said clamp on said cylindrical sectional bar with said opening gap closed and said elastomeric mount body pretensioned, wherein said mount body and said clamp are each formed in a continuous integral body having a cross-sectional circumference shape opposite said opening gap.

19. A rubber mount in accordance with claim 18, wherein said clamp includes two radially outwardly extending wings located opposite each other, said wings each including two surface elements located next to each other when said opening gap of said elastomeric mount body is mounted on said cylindrical sectional bar and closed said closing device including straps as part of said clamp, said straps being arranged at the axial ends of said wings, said straps being arranged at one of said surface elements with each strap bent with respect to a respective surface element to surround the respective surface element to keep the elastomer under pretension, said wings having an opening for fastening the mount to other assembly units.

20. A rubber mount in accordance with claim 19, wherein said wings include a set of lugs to reinforce said clamp, said lugs projecting from an outer axial end of said wings and extending to an outer axial region of said surface elements adjoining said wings in an area of a transition of a circumferential surface surrounding said mount body to said surface elements.

21. The rubber mount according to claim 2, wherein said surface elements of said wing facing away from said opening gap are connected to one another by means of an axially extending bending forming an axial edge on each of said wings.

22. The rubber mount according to claim 11, wherein said plastic shell has an axially extending opening gap.

23. The rubber mount according to claim 12, wherein said mount body and said plastic shell are arranged between said collar rings and are axially fixed by means of said collar rings.

24. The rubber mount according to claim 13, wherein said sectional bar is pressed through said opening gap of said mount body arranged in said clamp and said clamp itself.

25. The rubber mount according to claim 2, wherein said clip comprises a cylindrical section arranged between said wings, and said elastomeric mount body is arranged in said cylindrical section.

26. The rubber mount according to claim 25, wherein said cylindrical section comprises of two separate half cylinders, and each half of said two separate half cylinders are connected with one another by means of an axially extending bending of each of said wings facing away from said opening gap, and said bending forms an axial edge on each of said wings.

* * * * *